United States Patent [19]

Nimura et al.

[11] Patent Number: 5,329,348
[45] Date of Patent: Jul. 12, 1994

[54] METHOD OF IDENTIFYING A PARTICULAR OPTICAL CABLE OUT OF A NUMBER OF SIMILAR OPTICAL CABLES

[75] Inventors: Hijiri Nimura, Ichihara; Akira Fujisaki, Ichikawa; Kazunori Nakamura; Haruki Ohgoshi, both of Yokohama, all of Japan

[73] Assignee: The Furukawa Electric Co., Ltd., Tokyo, Japan

[21] Appl. No.: 955,367

[22] Filed: Oct. 5, 1992

[30] Foreign Application Priority Data

Oct. 4, 1991 [JP] Japan .................. 3-284148

[51] Int. Cl.$^5$ ................ G01N 21/84; G01N 21/21
[52] U.S. Cl. .................................... 356/73.1
[58] Field of Search ........................ 356/73.1

[56] References Cited

U.S. PATENT DOCUMENTS 5,202,746  4/1993  Sentsui et al. .................. 356/73.1

OTHER PUBLICATIONS

Chinone et al. "Elasto-optic polarization measurement in optical fiber", Optics letters vol. 6 #1, Jan. 1981 pp. 16-18.

*Primary Examiner*—Vincent P. McGraw
*Attorney, Agent, or Firm*—Jacobson, Price, Holman & Stern

[57] ABSTRACT

There is provided a method of identifying a particular optical cable out of a plurality of similar optical cables in a simple, quick and accurate manner without requiring any significant additional cost. For identifying a particular optical cable C2 out of a plurality of optical cables C1 through C3 by means of a means for transmitting optical signals 11, a signal receiving/detecting means 13 and a signal applying device 16 and by utilizing the fluctuation in the level of optical signal due to the photoelastic effect that appears when external signals are applied to a cable carrying an optical signal, external signals are applied to the outer peripheral surface of each of the optical cable at a plurality of spots to boost the level of fluctuation of optical signal so that the particular optical cable can be identified without fail. Thus, the method of the present invention can be used to identify a particular optical cable out of a plurality of similar optical cables in an accurate and reliable manner by using a simple means of applying external signals.

6 Claims, 4 Drawing Sheets

METHOD OF IDENTIFYING A PARTICULAR OPTICAL CABLE OUT OF A NUMBER OF SIMILAR OPTICAL CABLES

BACKGROUND OF THE INVENTION

1. Field of Invention

This invention relates to a method of identifying a particular optical cable out of a number of similar optical cables at any point along the route of installation.

2. Prior Art

In modern telecommunication systems, optical cables are housed in ducts and conduits and laid along the route of installation.

With the recent development of telecommunication networks, a large number of different optical cables are often laid along a single route of installation.

Particularly in the case of an optical LAN system installed in a so-called intelligent building, a large number of optical cables are often housed in a single duct to produce a congested condition there, anticipating an increase in the number of subscribers of telecommunication services in the future. Optical cables are accompanied by greater possibilities than ever of branching and replacing operations after the initial installation.

FIG. 9 of the accompanying drawings schematically illustrates a typical telecommunication network comprising central stations 01, relay stations 02 and terminal stations 03 interconnected by means of a large number of optical cables C, which are often ramified, star-connected and looped.

Since many of these optical cables resemble to one another, skilled workers find it difficult to single out a particular optical cable at a given intermediate point that needs to be branched or replaced out of a number of cables that have been laid in a same route of installation.

In an attempt to remedy this problem, LaidOpen Japanese Patent Nos. 2-230105 and 2-230106 propose methods of identifying a particular optical cable by utilizing fluctuation of polarized light in a single mode optical fiber.

Referring to FIG. 10, with these known methods, polarized light is transmitted through a single mode optical fiber of an optical cable C from a light source 1 of a light source station while an external signal (such as mechanical vibration) is applied to the optical cable C at a work site by means of a signal application device 2 so that any fluctuation in the level of polarized light caused by the external signal may be detected to identify the optical fiber by a photodetector 3 as the light is received by a light receiving device 4 at a detecting station.

More specifically, while the operator of the light source station applies a given signal to a particular optical fiber of each of the optical cables in the route for signal transmission and the operator of the detecting station monitors the reception of the signal, the operator in the work site sequentially applies an external signal to the optical cables laid there on a one by one basis and, each time an external signal is applied to an optical cable, the operator at the work site and his colleague at the talk over through a radio communication channel, using, for instance, a pair of transceiver to make sure if the optical cable in question is detected or not.

As the operation of sequentially applying an external signal to the optical cables laid in the work site proceeds on a one by one basis, the operator there will eventually come across the optical cable in question to apply a signal to it and the operator monitoring the signals at the detecting station will detect the cable carrying a fluctuated signal.

Then, the operator at the detecting station notifies his colleague at the work site that the cable to which an external signal is applied last time is the optical cable to be detected so that the latter can identify the optical cable.

Now, the optical cable is identified and the operator on the work site can proceed to a predetermined work to be conducted on the cable in question. The above described known method is advantageous in that it reduces the workload of operators and does not damage optical cables when compared with the local detection method and the local injection method where cable sheaths need to be dismantled to identify a particular optical cable.

The above described known method is used better with the photoelastic effect than with the Faraday effect in terms of the dimensions of the equipment involved and the required capacity of the power source. However, the above described known method of identifying an optical cable by utilizing the fluctuation of polarized light wave is accompanied by certain problems to be solved particularly when it is used with the photoelastic effect. Some of the problems will be described below.

Firstly, it is rather difficult to find an appropriate spot located closest to the active optical fiber of the optical cable in question (which is currently transmitting optical signals) for externally applying signals to that active optical fiber because no one can tell where the active optical fiber can be found from outside.

In many occasions, consequently, the spot selected for applying signals can be remote from the active optical fiber and the objects existing between them within the optical cable can hinder the transmission of mechanical vibration, absorbing the energy of vibration of the applied external signal and lowering the SN ratio to a level below the minimum level (20 dB) required for a signal detector.

If such is the case, the fluctuation in the level of the optical signal detected by the signal detector at the detecting station can be very small and hardly discriminated from noise, leading the operator observing the monitor at the detecting station to commit errors in recognizing the fluctuated signals.

Secondly, a phenomenon of cross talk can take place in adjacent optical cables when the frequency of the external signal (mechanical vibration) applied to an optical cable is low.

This means that the applied external signal is transmitted through not only the optical cable to which it is applied but also any of the optical cables laid in its vicinity to produce a condition where identification of cables is impossible or misidentification of cables can occur.

This problem may be partly avoided by observing higher harmonics in addition to the fundamental wave to identify the external signal.

However, the higher harmonics are not attenuated to a nil level if they leak from the optical cable in question and go into adjacent optical cables and, therefore, the utilization of higher harmonic cannot provide a perfect solution to the above described problem.

SUMMARY OF THE INVENTION

In view of the above discussed technical problems, it is therefore an object of the present invention to provide a method of identifying a particular optical cable out of a number of similar optical cables at any point along the route of installation in an easy, swift and economical manner.

According to the invention, the above object is achieved by providing a method of identifying a particular optical cable out of a number of similar optical cables laid along a same route of installation comprising steps of sequentially applying an external signal at an intermediate point of each of the optical cables on a one by one basis by a signal applying means while transmitting an optical signal from a signal transmitting means to a signal receiving/detecting means by way of a particular optical fiber in each of the optical cables and detecting the signal receiving/detecting means any fluctuation of the optical signal transmitted through the particular optical cable caused by the photoelastic effect when an signal is applied to the particular cable, characterized in that a plurality of external signals are sequentially applied at respective spots on the outer peripheral surface of each of the optical cables.

For the purpose of the present invention, external signal are preferably applied to each of the cables laid along a same route of installation at three or more than three spots on the peripheral surface of each cable and, more preferably, external signals are applied to each able at these spots at different points of time.

For the purpose of the present invention, the frequency of the external signals which are mechanical vibration is preferably found between 1 and 550 kHz and the duration of time of applying an external signal is found between 0.01 and 2 seconds at any spot of signal application.

Vibration and/or stress having a frequency greater than the maximum frequency (except the carrier frequency) of the external signals may preferably applied to the terminal of the optical fiber on the side of the signal receiving/detecting means when an external signal is applied to an intermediate point of each of the optical cables on a one by one basis by the external signal applying means while an optical signal is being transmitted from the signal transmitting means to the signal receiving/detecting means by way of an optical fiber of each of a number of similar optical cables laid along a same route.

The method of identifying a particular optical cable according to the present invention is used, by definition, at installations where a number of similar optical cables are laid along a same route.

The optical signals transmitting means and the optical signal receiving/detecting means are connected to the respective ends of the optical cables and the external signal applying means is arranged at an intermediate point along the route of installation of the optical cables.

Normally, the optical signal transmitting means and the optical signal receiving/detecting means are respectively located at the light source station and the detecting station while the external signal applying means is disposed on the work site.

While the cables laid along a same route of installation can be identified at the light source station and the detecting station, they cannot be identified at the work site.

Thus, when a particular cable needs to be identified at the work site, the operators at the light source station, the detecting station and the work site cooperate for that purpose in a manner as described below.

The operator at the light source station transmits an optical signal (polarized light) to the detecting station by way of a particular optical fiber of each of the optical cables and the operator at the detecting station detects the optical signal.

While the optical signal is being transmitted, the operator at the work site applies external signals (mechanical vibration) to each of the optical cables on a one by one basis at an intermediate point along the route of installation.

When an external signal is applied to the optical fiber of the optical cables through which an optical signal is being transmitted, there may arise photoelastic effect of fluctuating the level of the optical signal which is being transmitted through the optical cables and then the fluctuation, if any, in the level of the signal is displayed on the monitor screen of the optical signal receiving/detecting means. So, the operator at the work site asks his or her colleague at the detecting station if the phenomenon of signal fluctuation is observed on the optical cable in question or not each time he or she applies an external signal at the work site until the optical cable in question is identified.

An optical cable typically comprises a tension member running along the central axis of the cable and a plurality of optical fibers arranged around and extending along the tension member.

Since the optical cable is normally housed in a opaque sheath, the optical fibers of the cable cannot be seen from outside for their identification.

When an external signal applying device is placed on a randomly selected spot on the outer peripheral surface of an optical cable having a configuration as described above, it is not likely that the signal applying device is placed at a location possibly closest to a particular optical fiber and, if the signal applying device is placed at a location remotest from the particular optical fiber, the external signal applied by the signal applying device cannot possibly reach the optical fiber through which an optical signal is being transmitted.

This problem is solved by the method of the present invention as a plurality of external signals are applied at respective spots on the peripheral surface of each of the optical cable laid along a same route of installation. The spots selected for signal application normally divide the circumference of the cross section of the cable passing through the spots into equal circular arcs.

When the number of the spots is equal to or greater than three, the probability with which the signal applying device is placed at a location possibly closest to the optical fiber through which an optical signal is being transmitted is increased by equal to or greater than the times as compared with the case where the signal applying device is placed on a single spot. Similarly the probability with which the signal applying device is placed at location possibly remotest from the optical fibre in question is reduced to a third or less of that of the above referred case.

For identifying a particular cable out of a number of similar cables by using the method of the present invention, a plurality of spots for applying an external signal are selected on the outer peripheral surface of each of the cables and an external signal is applied to each of the spots by means of a signal applying device.

Then, a particular optical fiber (transmitting an optical signal) in each of the optical cables will receive energy of vibration to the greatest extent when an external signal is applied to it from a spot which is located closest to the optical cable so that the level of the optical signal being transmitted through the optical fiber is subjected to fluctuation to the greatest extent because of the photoelastic effect of the signal. Such fluctuation in the level of optical signal can be easily detected by a signal receiving/detecting means.

Therefore, the method of the present invention that utilizes the fluctuation in the level of an optical signal to identify a particular optical cable is practically free from any misidentification or failure of identification and provides a reliable means for identifying a particular optical cable in an installation site.

When external signals are applied by using the method of the present invention to a particular optical cable transmitting an optical signal) from respective spots on the outer peripheral surface of the optical cable containing the optical fiber, they may be applied either simultaneously from a number of signal applying devices or sequentially from one or more than one signal applying devices.

The technique of simultaneously applying external signals consumes more electricity and can produce a smaller S/N ratio because of the non-uniformity in the external signals (vibrations) due to the interference of vibrations in the transverse direction of the optical cable depending on the configuration of the optical cable.

To the contrary, the technique of sequentially applying external signals consumes less electricity and can produce a greater S/N ratio as no interference of vibrations occurs in the transverse direction of the optical cable. Therefore, this technique is more reliable in identifying a particular optical cable by a signal receiving/detecting means.

Thus, the technique of sequentially applying external signals is preferable to the technique of simultaneously applying external signals.

External signals to be used for the purpose of the present invention preferably have a frequency of equal to or greater than 1 kHz and more preferably they have a frequency of equal to or greater than 25 kHz so that they may easily be discriminated from environmental disturbance such as natural vibration (with a frequency of approximately 100 Hz).

The reason of selecting a frequency equal to or greater than 250 kHz is that external signals can give rise to auditory nuisance to the operator and his or her colleagues at the work site because they are audible sounds of their frequency is less than 25 kHz (around 20 kHz).

Besides, external signals having a frequency equal to or greater than 25 kHz are not likely to be absorbed by the cable sheath and less affected by cross talk.

External signals having a frequency greater than 25 kHz are not preferable because they are rather small in vibration and their polarized waves can be only poorly fluctuated.

The duration of time of applying an external signal is preferably between 0.01 and 2 seconds.

The reason for this is that, if the duration of time of applying an external signal is in short of 0.01 second, there may be an insufficiency of signal volume and, if the duration of time of applying an external signal exceeds 2 seconds, there may be an excess signal volume.

When an external signal is applied to an optical cable form outside toward the inside of the cable while an optical signal is being transmitted through a particular optical fiber in the optical cable by using the method of the present invention, the signal receiving condition for the signal receiving/detecting means can be improved if vibration and/or stress having a frequency greater than the maximum frequency of the external signal (other than the carrier frequency) is applied to the output terminal of the optical fiber.

Therefore, the operation of identifying a particular optical cable by using optical cable by using the method of the present invention can become more reliable if it is used with such a technique of securing the transmission of polarized light.

Now the present invention will be described in greater detail by referring to the accompanying drawings.

BEST MODE OF CARRYING OUT THE INVENTION

Now, the present invention will be described by referring to the accompanying drawings that illustrate the best mode of carrying out the invention.

Figure 1:
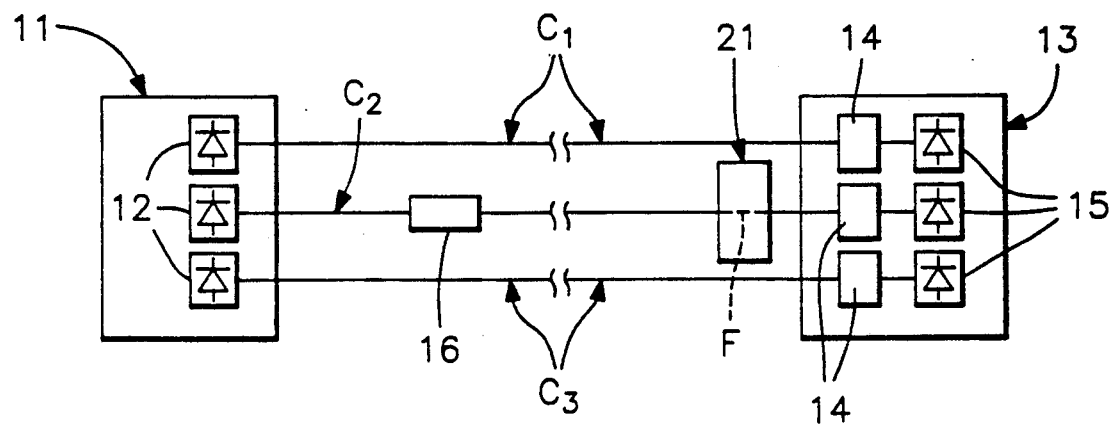
FIG. 1 is a schematic illustration of an optical cable system to which the method of the present invention is applied.

Referring firstly to FIG. 1, C1, C2 and C3 respectively denote optical cables. Reference numerals 11, 13, 16 and 21 respectively denote a signal transmitting means, a signal receiving/detecting means, a signal applying device and a polarization securing device.

Each of the optical cables C1, C2 and C3 comprises a tension member and a large number of single mode type and/or multiple mode type optical fibers as well as other components, which are housed in a common sheath.

If any of the optical cables C1 through C3 mainly comprises multiple mode type optical fibers, it also comprises at least a single mode optical fiber.

The single mode optical fiber or one of the single mode optical fibers of each of the optical cables C1 through C3 is used for the transmission of optical signals, which will be described later.

Since the optical cables C1 through C3 are normally laid along a same route of installation and housed in a common duct or conduit, they will hereafter be referred to as laid optical cables C1 through C3.

The signal transmitting means 11 normally comprises light sources 12 such as LDs or LEDs as its principal components, which light sources 12 are optically connected to respective ends (input terminals) of the single mode type optical fibers F of the laid optical cables C1 through C3.

The signal receiving/detecting means 13 typically comprises waveguide type photodetectors 14 for detecting polarized light and modulating its intensity, light receiving devices 15 such as PDs or APDs and other components.

Each of the photodetectors 14 and the corresponding to one of the light receiving devices 15 of the signal receiving/detecting means 13 are connected with each other and the photodetectors 14 are optically connected to the respective other ends (output terminals) of the single mode type optical fibers F of the laid optical cables C1 through C3.

The signal applying device 16 utilizes the interaction of sound wave and light in order to generate supersonic oscillation as mechanical vibration.

More specifically, the signal applying device 16 comprises a plurality of piezoelectric devices 17a, 17b and 17c for converting electric signals into acoustic signals.

The piezoelectric devices 17a through 17c are disposed on the outer peripheral surface of the sheath of one of the laid optical cables C1 through C3 at an intermediate point of the cable.

Typically, the piezoelectric devices 17a through 17c are disposed on the outer peripheral surface of the sheath of one of the laid optical cables C1 through C3 at a work site.

Figure 3:
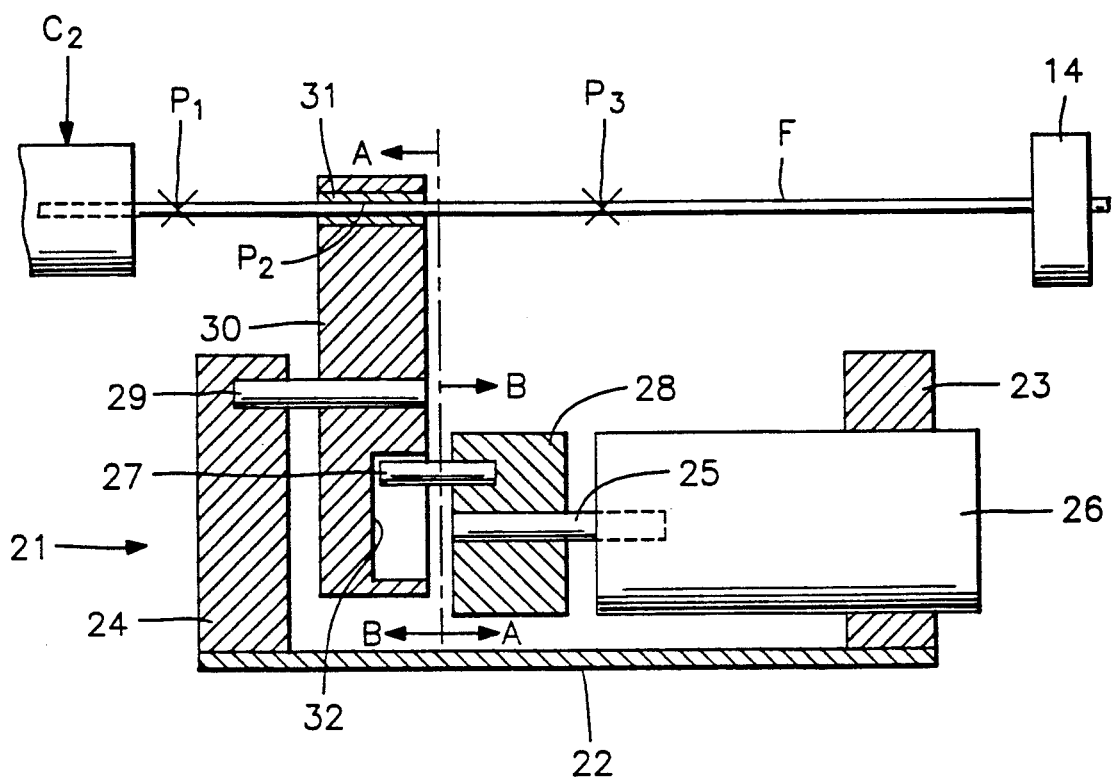
FIG. 3 is a schematic sectional view of a device of securing the transmission of polarized light to be used with the method of identifying an optical cable according to the present invention.
Figure 4:
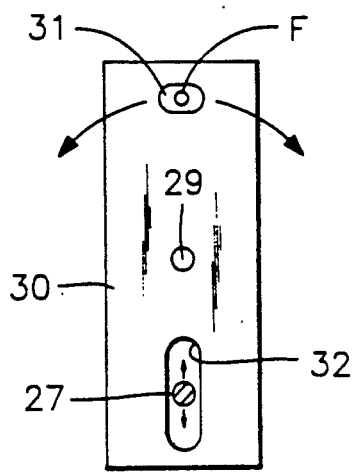
FIG. 4 is a sectional view along line A—A of FIG. 3.
Figure 5:
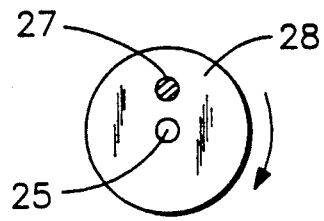
FIG. 5 is a sectional view along line B—B of FIG. 3.

As shown in FIGS. 3 through 5, the polarization securing device 21 comprises a base plate 22, a pair of support members 23, 24, a motor 26 having a rotary shaft 25, a rotary member 28 having an eccentric pin 27, a pivot 29 and a swinging body 30.

The eccentric pin 27 of the rotary member 28 is stuck into the latter at an eccentric point on one of its surface.

The swinging body 30 has a holding hole 31 bored through it in an upper region for holding an optical fiber and a vertically oblong groove 32 cut in a lower region thereof.

Referring particularly to FIG. 3, the pair of support members 23, 24 are kept upright at opposite ends of the base plate 22.

The motor 26 is fitted to the support member 23 and the rotary member 28 is fitted to the rotary shaft 25 of the motor 26, while the swinging body 30 is rotatably fitted to the other support member 24 by way of a pivot 29 so that the eccentric pin 27 of the rotary member 28 is slidably engaged in the oblong groove 32 of the swinging body 30 formed in an lower region thereof.

Figure 2:
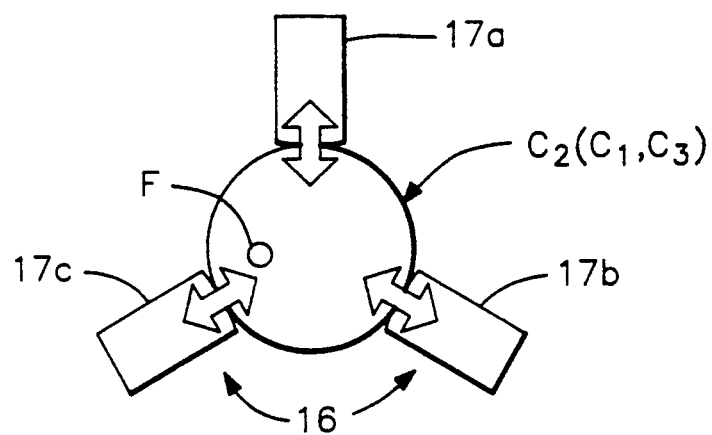
FIG. 2 is a sectional view of an optical cable, schematically showing how external signals are applied to the cable to identify it at an intermediate point of the route of installation.

Referring to FIGS. 1 and 2, if the laid optical cable C2 needs to be identified, the cable C2 can, as a matter of course, be easily identified by the operators at the signal transmitting means 11 and the signal ⊛ receiving-/detecting means 13 but it cannot be visually identified by the operator stationed at a work site somewhere on an intermediate point of the route of installation of the cables because the laid optical cables C1 through C3 resemble to one another in appearance.

According to the present invention, the optical cable C2 can be identified at the work site by applying external signals (mechanical vibrations) to each of the laid optical cables C1 through C3 at the work site by means of the piezoelectric devices 17a through 17c of the signal applying device 16 while polarized light (optical signal) is being transmitted from the light sources 12 of the signal transmitting means 11 by way of the single mode type optical fibers F of the laid optical cables C1 through C3 and received by the photodetectors 14 of the light receiving devices 15.

The optical signal passing through any of the single mode type optical fibers F of the laid optical cables C1 through C3 is converted into a signal having a plane of polarization modulated by the photoelastic effect when an external signal is applied to the optical fiber before it is modulated to an intensity modulated signal by the corresponding photodetector 14 and received by the light receiving device 15 connected thereto in the signal receiving/detecting means 13.

As external signals are applied to the laid optical cables C1 through C3 randomly on a one by one basis, for instance, in the order of C1, C3 and C2, the signal receiving/detecting means 13 can see which one of the laid optical cables C1 through C3 is currently subjected to the application of external signals, or that external signals are applied sequentially to the cables in the order of C1, C3 and C2.

Thus, each time the operator at the work site applies a set of external signals to one of the laid optical cables C1 through C3, he or she asks his or her colleague at the signal receiving/detecting means 13 who is monitoring the reception of optical signals if he or she has come across the optical cable in question, which is the cable C2, by an appropriate telecommunication means.

If, as described above, external signals are applied to the cables in the order of C1, C3 and C2, the operator stationed at the signal receiving/detecting means 13 identifies the cable to which external signals are applied for the last time as the cable C2 and then the operation of identifying the cable is completed.

If the external signals applied to the cables have a frequency as low as 100 Hz, the modulation of the optical signals by external signals can hardly be discriminated from that of the optical signals by external disturbances (natural vibrations), making it very difficult to identify any particular optical cable.

Figure 6:
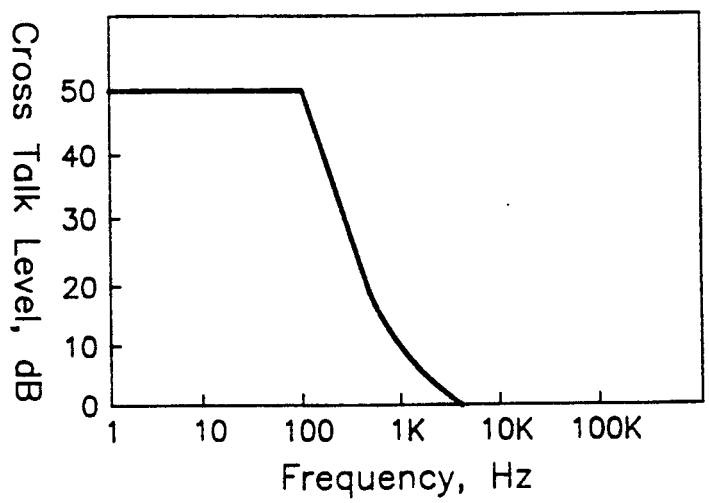
FIG. 6 is a graph schematically illustrating the relationship between the frequency of the applied external signal and the resultant cross talk level.

FIG. 6 schematically illustrates the relationship between the frequency of the applied external signal and the resultant cross talk level obtained in an experiment.

As clearly seen from FIG. 6, the phenomenon of cross talk remarkably appears in adjacent optical cables when the frequency of the applied external signal is lower than 7 kHz.

Since the maximum SN ratio of the external signal is 50 dB in the optical cables used in the above experiment as shown in FIG. 6, it may be clear that optical cables adjacent to the one subjected to external signals having such a SN ratio are also affected by the external signals.

If external signals have a frequency higher than 10 kHz, they are absorbed by the sheath of the cable and, therefore, the SN ratio of the external signals transferred from an optical cable to any adjacent optical cables can be suppressed to below 10 dB.

With such an arrangement, there would be no misidentification of the optical cables.

External signals (mechanical vibrations) having a frequency lower than 25 kHz are, however, audible and can give rise to auditory nuisance to the operator and aggregate the environment of the work site.

In consideration of the above described problems, the frequency of external signals (mechanical vibrations) applied to the optical cables at a work site needs to be equal to or higher than 25 kHz.

For the purpose of the present invention, the signal applying device 16 comprises a plurality of piezoelectric devices 17a through 17c for applying external signals at a plurality of spots (of signal application) on the peripheral surface of each of the laid optical cables.

When external signals are applied to a laid optical cable at spots of signal application by means of a signal applying device 16, they may be applied either simultaneously or sequentially (with time lags).

When external signals are applied sequentially, the piezoelectric devices 17a through 17c may be sequentially used in any order and the duration of each external signal may be arbitrarily determined. External signals may be applied either simultaneously and continuously without providing any pauses therebetween or sequentially with a short pause provided between two successive signals.

Figure 7:
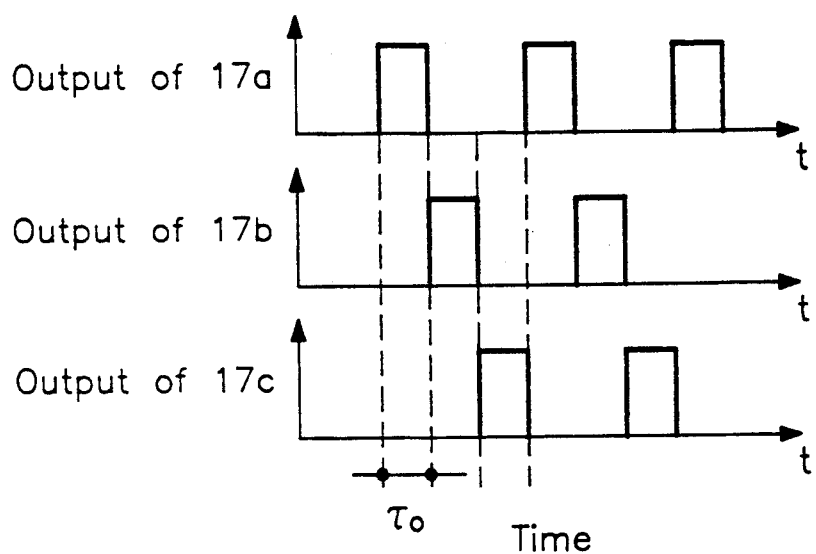
FIG. 7 is a graph schematically illustrating how external signals are applied with time for the purpose of the present invention.

FIG. 7 illustrates how external signals are applied with time when external signals having a frequency of 25 kHz or 100 kHz and a duration of time of o are sequentially and successively applied by three piezoelectric devices 17a through 17c in the described order.

Figure 8:
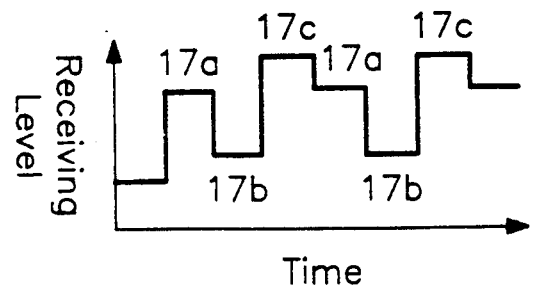
FIG. 8 is a graph schematically illustrating the levels of the signals received by the signal receiving/detecting means for the purpose of the present invention.
Figure 9:
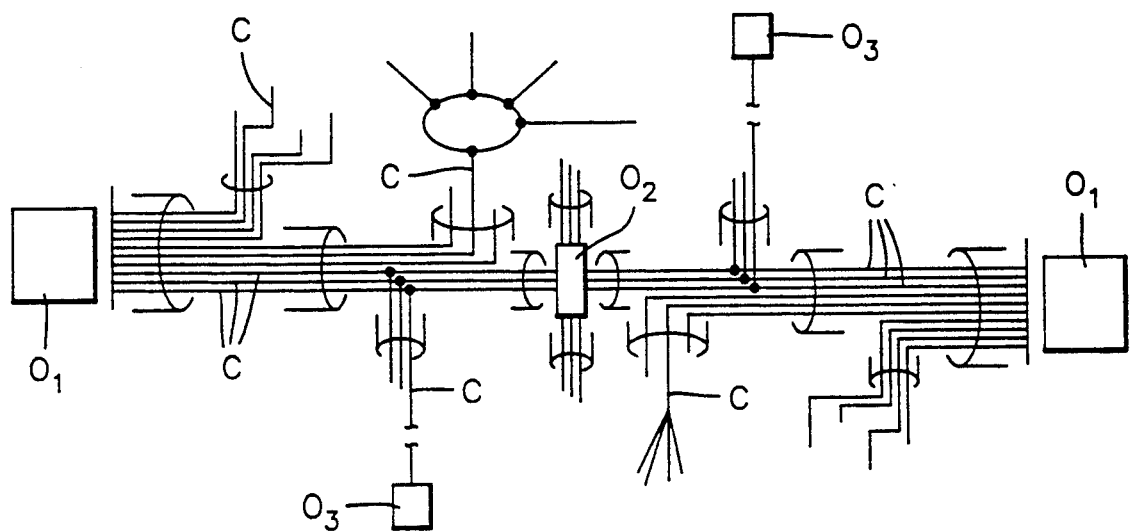
FIG. 9 is a schematic illustration of an optical cable network.
Figure 10:
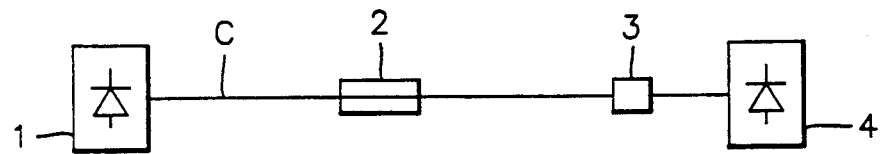
FIG. 10 is a schematic illustration of a conventional method of identifying a particular optical cable.

FIG. 8 illustrates the levels of the external signals received by the signal receiving/detecting means 13.

When external signals are applied to the laid optical cables in a manner as illustrated in FIG. 7, they are satisfactorily applied to the particular optical fibers F of the laid optical cables and a satisfactorily high SN ratio of the optical signals received by the signal receiving/detecting means 13 is ensured regardless of the location of the particular optical fibers F in the respective laid optical cables.

When external signals are applied to the laid optical cables in a manner as illustrated in FIG. 7, the power consumption level at any moment during the signal applying operation is a third of the consumption level of an operation where the piezoelectric devices 17a through 17c are driven simultaneously. So, batteries may be advantageously used as power source in the former case.

As illustrated in FIG. 3, when a polarization securing device 21 is used for the purpose of the present invention, an end portion of the optical fiber F taken out of the output terminal of any of the laid optical cables (C1, C2, C3) is made to pass through the holding hole 31 of the swinging body 30 so that a portion P2 of the optical fiber F is held in the holding hole 31 while the optical fiber F is clamped by appropriate clamping means at two portions P1, P3 of the optical fiber F located outside the holding hole 31.

With such an arrangement, when the rotary shaft 25 is driven to rotate by the motor 26 to consequently rotate clockwise the rotary member 28 fitted to the rotary shaft 25, the swinging body 30 swings back and forth in the directions of the arrows in FIG. 4 around the pivot 29 with a period of because of the engagement of the oblong groove 32 of the swinging body 30 and the eccentric pin 27 of the rotary member 28.

Now, as the swinging body 30 is swung back and forth, the portions P1 through P3 of the optical fiber F become twisted and oscillated.

As the portions P1 through P3 of the optical fiber are subjected to such external force, there appear phenomena as described below.

One of the phenomena is that, assuming that an ordinate and an abscissa passing through the center of a cross section of the optical fiber F and are respectively denominated as y-axis and x-axis and the longitudinal axis of the cable is denominated as z-axis, the density of the optical fiber F is differentiated in the directions of the y-axis and the x-axis when the optical fiber F is put under stress of vibration in the direction of the y-axis and the differentiated density results in a differentiation in the refractive index of the optical fiber F.

Another phenomenon is that there arises a phase difference between the x-polarization and the y-polarization of the optical signal (polarized light) passing through the optical fiber F to cause changes to take place in the polarized state of the optical signal when the optical fiber F is subjected to external force of vibration.

Still another phenomenon is that there is a difference in the helical advancement of polarization between the clockwise advancement and the counterclockwise advancement so that the principal axis of polarization of the light entering the optical fiber can be rotated.

Thus, when the optical fiber F is subjected to stress of vibration at the portions P1 through P3 by means of the polarization securing device 21, the polarization of the optical signal passing through the optical fiber F is modulated with a period of t to positively affect the operation of cable identification.

More specifically speaking, if vibration and/or stress having a frequency greater than the maximum frequency (except the carrier frequency) of the external signals are applied to the output terminal of the optical fiber F or, differently stated, if the output terminal of the optical fiber F (the terminal located at the signal receiving/detecting means 13) is subjected to an oscillatory movement following a circular arc with a frequency of $\tau(1/f)$ which is shorter than the shortest period to of the external signals, the signal receiving/detecting means 13 can have a good reception of signals at least once in every $\tau(=1/f)$ seconds because of the oscillatory movement of the output terminal of the optical fiber F with a frequency of $1/\tau Hz (>1/\tau o)$.

When a polarization securing means (device 21) as illustrated in FIGS. 3 through 5 is used, a wide dynamic range is available for the transmission of optical signals because there is no need for branching the optical wave guide that may entail a considerable loss in the quantity of light.

A polarization securing means as illustrated in FIGS. 3 through 5 is advantageous over a polarization diversity telecommunication technique or a technique using photocouplers which will be described below.

The polarization diversity telecommunication is a technique to be used for improving the reception of signals by dividing the optical transmission path into a plurality of different directions and utilizing the best signal out of the received signals that have been transmitted by way of these diversified optical transmission paths.

The technique of polarization diversity telecommunication is accompanied by the problem of loss in the quantity of light that occurs when the signal transmission path is divided at the signal receiving terminal. The loss will be approximately 3 dB when the path is divided into two and approximately 5 dB when divided into three.

This means that a light source having a large output power or a device for boosting the output power is required when the polarization diversity telecommunication technique is used for an optical communication system having a long distance of signal transmission.

In addition to the above problem, the photodetectors provided at the output terminal of the optical communication system using the technique of polarization diversity telecommunication need to have a relative angular difference of /4 for the principal axis, although such photodetectors are prepared only with a high degree of elaboration and high manufacturing cost.

The technique of using photocouplers and selecting a relative angular difference of /4 for the principal axis of the photodetectors disposed at the output terminal of the optical communication system is not feasible because of the technical difficulties it involves.

Thus, the use of a polarization securing means as illustrated in FIGS. 3 through 5 is a useful and advantageous way of improving the reliability of the operation of identifying a particular optical cable because it does not involve any loss in the quantity of light and is not costly for the modulation of polarization.

For the purpose of the present invention, a means of signal transmission 12 and a signal receiving/detecting means 13 may be put together into a unit, which will be connected to an end of the laid optical cables.

When both the means of signal transmission 12 and the signal receiving/detecting means 13 are put together into a unit and connected to a same end of the laid optical cables, two single mode type optical fibers in a same laid optical cable are respectively connected to the means of signal transmission 12 and the signal receiving/detecting means 13 at an end of the optical cable and an optical fiber for reflecting optical signals is connected to these optical fibers at the other end of the optical cable.

According to the invention, since the fluctuation in the level of an optical signal that appears when external signals are applied to an optical cable due to the photoelastic effect is utilized to identify a particular optical cable and external signals are applied to the outer peripheral surface of optical cable at a plurality of spots, the fluctuation in the level of the optical signal is boosted and a particular optical cable can be surely identified on the basis of the fluctuation in the level of the optical signal.

Thus, with the method of the present invention, a particular optical cable can be identified out of a plurality of similar optical cables in a reliable and quick manner by using a relatively simple technique of applying external signals to the outer surface of each of the optical cables at a plurality of spots.

When external signals are applied sequentially to optical cables, the level of power consumption can be significantly reduced and any interference of external signals in a transverse direction of the optical cable to increase the SN ratio of the signals and, therefore, make the method of the present invention even more reliable.

The additional use of a polarization securing means of a given type with the method of the present invention can significantly improve the reception of optical signals by the signal receiving/detecting means to make the method of the present invention further reliable.

Particularly, since the polarization securing means applies given vibration and/or stress to the end of the optical fiber where the signal receiving/detecting means is located, it does not involve any loss in the quantity of light and require any costly components to enhance the reliability and the economic feasibility of the method of identifying a particular optical cable of the present invention.

What is claimed is:

1. A method of identifying a particular optical cable out of a number of similar optical cables laid along a same route of installation comprising steps of sequentially applying an external signal at an intermediate point of each of the optical cables on a one by one basis by a signal applying means while transmitting an optical signal from a signal transmitting means to a signal receiving/detecting means by way of a particular optical fiber in each of the optical cables and detecting by the signal receiving/detecting means any fluctuation of the optical signal transmitted through the particular optical cable caused by the photoelastic effect when an external signal is applied to the particular cable, characterized in that a plurality of external signals are sequentially applied at respective spots on the outer peripheral surface of each of the optical cables.

2. A method of identifying a particular optical cable according to claim 1, wherein external signals are preferably applied to each of the cables laid along a same route of installation at three or more than three spots on the peripheral surface of each cable.

3. A method of identifying a particular optical cable according to claim 1, wherein external signals are preferably applied to each of the cables laid along a same route of installation at different points of time.

4. A method of identifying a particular optical cable according to claim 1, wherein the frequency of the external signals which are mechanical vibrations is preferably found between 1 kHz and 550 kHz.

5. A method of identifying a particular optical cable according to, claim 1, wherein the duration of time of applying an external signal is found between 0.01 and 2 seconds at any spot of signal application.

6. A method of identifying a particular optical cable according to claim 1, wherein vibration and/or stress having a frequency greater than the maximum frequency of the external signals is applied to the terminal portion of the optical fiber on the side of the signal receiving/detecting means when an external signal is applied to an intermediate point of each of the optical cables on a one by one basis by the external signal applying means while an optical signal is being transmitted from the signal transmitting means to the signal receiving/detecting means by way of an optical fiber of each of a number of similar optical cables laid along a same route of installation.

* * * * *